(12) United States Patent
Litsyn et al.

(10) Patent No.: US 7,822,129 B2  
(45) Date of Patent: Oct. 26, 2010

(54) CONSTRUCTIVE METHOD OF PEAK POWER REDUCTION IN MULTICARRIER TRANSMISSION

(75) Inventors: Simon Litsyn, Givat Shmuel (IL); Alexander Shpunt, Tel Aviv (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 1132 days.

(21) Appl. No.: 11/458,691

(22) Filed: Jul. 20, 2006

(65) Prior Publication Data

US 2009/0034649 A1  Feb. 5, 2009

Related U.S. Application Data

(60) Provisional application No. 60/701,081, filed on Jul. 21, 2005.

(51) Int. Cl.  
*H04L 27/28* (2006.01)

(52) U.S. Cl. .................................................. 375/260

(58) Field of Classification Search .................. 375/219, 375/222, 260, 262, 265; 370/208, 210  
See application file for complete search history.

(56) References Cited

U.S. PATENT DOCUMENTS 6,307,892 B1  10/2001  Jones et al.

2003/0026201 A1  2/2003  Arnesen  
2004/0141548 A1*  7/2004  Shattil ........................ 375/146

OTHER PUBLICATIONS

Sharif and Hassibi, "Existence of codes with constant PMEPR and related design,", IEEE Transactions on Signal Processing vol. 52 No. 10 pp. 2836-2846 (Oct. 2004).

G. Wunder and H. Boche, "Peak value estimation of bandlimited signals from their samples, noise enhancement, and a local characterization of the neighbourhood of an extremum", IEEE Trans. Signal Processing, vol. 51, 3, pp. 771-780 (2003).

Joel Spencer; "Six Standard Deviation Suffice", Transactions of the American Mathematical Society, vol. 289. No. 2 (Jun. 1985).

* cited by examiner

*Primary Examiner*—Young T. Tse  
(74) *Attorney, Agent, or Firm*—Mark M. Friedman

(57) ABSTRACT

A plurality of bits is transmitted by partitioning the bits among n subsets; encoding each subset as a respective symbol; selecting a balancing vector, in accordance with the symbols, from a set of size $2^p$ of codewords of length n in $\{-1,1\}$; multiplying each symbol by a corresponding element of the balancing vector; and transmitting the symbols substantially simultaneously. Preferably, the set of codewords has a strength of at most about $2 \ln \lfloor n \rfloor$. The balancing vector is selected either deterministically or probabilistically.

17 Claims, 2 Drawing Sheets

CONSTRUCTIVE METHOD OF PEAK POWER REDUCTION IN MULTICARRIER TRANSMISSION

This is a continuation-in-part of U.S. Provisional Patent Application No. 60/701,081, filed Jul. 21, 2005

FIELD AND BACKGROUND OF THE INVENTION

The present invention relates to digital communication and, more particularly, to a method and system for Peak-to-Mean-Envelope Power Ratio (PMEPR) reduction in multi-carrier transmissions such as Orthogonal Frequency Division Multiplexing (OFDM) systems.

One approach to the design of a bandwidth-efficient communication system in the presence of channel distortion is to subdivide the available channel bandwidth into a plurality of equal-bandwidth subchannels, with the bandwidth of each subchannel being sufficiently narrow that the frequency response characteristics of the subchannels are nearly ideal. With each of n subchannels we associate a subcarrier $\exp(i2\pi(f_0+lf_s))$ ($1 \leq l \leq n$) where i is the square root of $-1$, $f_0$ is the carrier frequency and $f_s$ is the carrier spacing. In OFDM, the symbol rate of each of the subchannels is set equal to the separation of adjacent subcarriers so that the subcarriers are orthogonal over the symbol interval, independent of the relative phase relationships of the subcarriers.

The complex envelope of the resulting multicarrier signal is $$m_\xi(t) = \sum_{l=1}^{n} \xi_l \exp(i2\pi(f_0 + lf_s)t), t \in [0, f_s^{-1})$$

where $\xi=(\xi_1, \ldots, \xi_n)$ is a complex vector with entries drawn from a constellation Q of symbols. The admissible codewords $\xi$ constitute a code C. Defining $\theta=2\pi f_s t$ gives $$|m_\xi(\theta)| = \left|\sum_{l=1}^{n} \xi_l \exp(i\theta l)\right|, \theta \in [0, 2\pi)$$

Then $$PMEPR(\xi) = \max_{\theta \in [0,2\pi)} \frac{|m_\xi(\theta)^2|}{E\{\|\xi\|^2\}}$$

$$PMEPR(C) = \max_{\xi \in C} PMEPR(\xi)$$

A major problem with multicarrier modulation in general and with OFDM systems in particular is this PMEPR, the high peak-to-average power ratio that is inherent in the transmitted signal. Large signal peaks occur in the transmitted signal when the signals in the n subchannels add constructively in phase. Such large signal peaks may saturate the power amplifier at the transmitter and thus cause intermodulation distortion in the transmitted signal. Intermodulation distortion can be reduced by reducing the power in the transmitted signal, so that the power amplifier always is operated in the linear range; but such a power reduction results in inefficient operation of the OFDM system.

Various solutions to this problem have been proposed. For example, Jones et al., in U.S. Pat. No. 6,307,892, perform bitwise addition modulo 2 of the codeword vector with a mask vector that is selected a priori, to be used with all codeword vectors, so as not to coincide with any of the possible codeword vectors. The method of Jones et al., and similar methods, are suboptimal in that they do not take into account the nature of the data actually being transmitted. For example, Jones et al. select a single mask vector to be used with all data.

The closest prior art solution to the present invention is that of Sharif and Hassibi, "Existence of codes with constant PMEPR and related design", *IEEE Transactions on Signal Processing* vol. 52 no. 10 pp. 2836-2846 (October 2004). Given specific data to transmit, Sharif and Hassibi selectively change the signs of the symbols $\xi_l$ to minimize PMEPR. Each symbol $\xi_l$ is multiplied by the corresponding element $\epsilon_l$ of a balancing vector $\epsilon$ of length n, all of whose elements are either +1 or −1.

Both the Jones et al. patent and the paper by Sharif and Hassibi are incorporated by reference for all purposes as if fully set forth herein.

The solution proposed by Sharif and Hassibi has an unsatisfactorily large rate loss. For example, their method gives a zero rate for BPSK modulation and halves the transmission rate if QPSK modulation is used.

There is thus a widely recognized need for, and it would be highly advantageous to have, a method of PMEPR reduction that would overcome the disadvantages of presently known methods as described above.

SUMMARY OF THE INVENTION

The present invention combines the merits of the balancing method of Sharif and Hassibi with insights from coding theory to provide PMEPR reduction with a much lower rate loss than in Sharif and Hassibi. According to the present invention, the balancing vector is selected only from a specific class of codewords. For example, using a systematic code of strength $2 \lfloor \ln n \rfloor$ as a pool for balancing vectors provides deterministic or probabilistic reduction of PMEPR with a very modest rate loss.

According to the present invention there is provided a method of transmitting a plurality of bits, including the steps of: (a) partitioning the bits among 17 subsets; (b) encoding each subset as a respective symbol; (c) selecting a balancing vector, in accordance with the symbols, from a set of size $2^p$ of codewords of length n in $\{-1,1\}$, where p<n; (d) multiplying each symbol by a corresponding element of the balancing vector; and (e) transmitting the symbols.

According to the present invention there is provided a transmitter for transmitting a plurality of bits, including: (a) a mechanism for partitioning the bits among n subsets; and (b) a modulator for: (i) encoding each subset as a respective symbol, (ii) selecting a balancing vector, in accordance with the symbols, from a set of size $2^p$ of codewords of length n in $\{-1,1\}$, where p<n, (iii) multiplying each symbol by a corresponding element of the balancing vector, and (iv) modulating each of n mutually orthogonal subcarriers with a corresponding the symbol.

According to the basic method of the present invention, a plurality of bits are transmitted by partitioning the bits among n subsets. (n is an integer greater than 1.) Each subset is encoded as a respective symbol. A balancing vector is selected, in accordance with the symbols, from a set of size $2^p$ of codewords of length n in $\{-1,1\}$, where p is a positive integer less than n. Each symbol is multiplied by a corresponding element of the balancing vector. Then, the symbols are transmitted, substantially simultaneously.

Preferably, transmitting the symbols includes modulating each of n mutually orthogonal subcarriers with a corresponding symbol.

Preferably, the set of codewords, from which the balancing vector is selected, has a strength of at most about $2\lfloor \ln n \rfloor$.

In a preferred deterministic embodiment of the method of the present invention, the balancing vector is the codeword, from the set of codewords from which the balancing vector is selected, that minimizes the PMEPR of the envelope of the transmitted symbols. In other words, from among all the codewords of the set, the selected codeword is the codeword that, when used as a balancing vector, gives the smallest PMEPR.

In a preferred probabilistic embodiment of the present invention, the balancing vector is selected by picking the codewords randomly from the set of codewords and calculating corresponding PMEPRs of the envelope of the transmitted symbols. The selected balancing vector is the codeword, from among the randomly selected codewords, whose corresponding PMEPR is the smallest. Most preferably, the codeword are picked randomly until a codeword is picked whose corresponding PMEPR is less than a predetermined upper bound. Alternatively, the codewords are picked randomly until the number of codewords that have been so picked exceeds a predetermined upper bound.

Preferably, p bits of side information are transmitted to indicate which codeword has been selected to be used as the balancing vector.

Preferably, the symbols are transmitted substantially simultaneously.

A basic transmitter of the present invention transmits a plurality of bits using the basic method of the present invention. Preferably, the transmitter is an OFDM transmitter. A communication system of the present invention includes the basic transmitter and a receiver for receiving the transmitted bits.

Another basic transmitter of the present invention, for transmitting a plurality of bits, includes a mechanism, such as a serial-to-parallel buffer, for partitioning the bits among n subsets, and a modulator. The modulator encodes each subset as a respective symbol. The modulator selects a balancing vector, in accordance with the symbols, from a set of size $2^p$ of codewords of length n in $\{\times 1,1\}$, where p is less than n. The modulator multiplies each symbol by a corresponding element of the balancing vector. Then the modulator modulates each of it mutually orthogonal subcarriers with a corresponding symbol.

A communication system of the present invention includes a preferred transmitter of the present invention, a receiver, and a medium for sending the analog signal from the transmitter to the receiver. The receiver includes an analog-to-digital converter for transforming the analog signal into received time-domain samples, a mechanism such as a serial-to-parallel buffer for parallelizing the received time-domain samples, a mechanism such as a Fourier transform unit for converting the received time-domain samples into n received orthogonal subcarriers, and a demodulator. The demodulator demodulates the received orthogonal subcarriers to recover n corresponding received symbols, multiplies each received symbol by a corresponding element of the balancing vector, and decodes each received symbol to obtain a corresponding subset of received bits.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of PMEPR reduction according to the present invention may be better understood with reference to the drawings and the accompanying description.

The Theory Section discusses the use of balancing vectors selected from a "balancing set" of size $2^p$ of codewords of length n in $\{-1,1\}$ and of strength 2s, where is an integer between 1 and $\lfloor \ln n \rfloor$ ($\lfloor \ln n \rfloor$ is the largest integer less than or equal to ln n). It is shown that if s=[ln n] then the PMEPR reduction of the present invention is ln n+2.01 ln ln n, which is asymptotically stronger than the PMEPR reduction achieved by Sharif and Hassibi and with a much lower rate loss.

The stronger the balancing set, up to an asymptotic (in n) limit of $2\lfloor \ln n \rfloor$, the better the PMEPR reduction, but the stronger the balancing set, the larger the balancing set, so that the improvement in PMEPR reduction that is obtained by using a stronger balancing set must be balanced against the larger size of the stronger balancing set. The smallest codeword set of a given strength is the dual-BCH code of that strength. Note that for finite n, the optimal balancing set strength may be greater than $2\lfloor \ln n \rfloor$.

The Theory Section describes two variants of the method of the present invention. The first variant is deterministic: the codeword that minimizes the PMEPR of the data to be transmitted is found explicitly by testing all the codewords of the balancing set. The second variant is probabilistic: codewords are picked randomly from the balancing set and tested until a codeword that gives an acceptably low PMEPR is found for the data to be transmitted, or until a maximum allowed number of picked and tested codewords is reached.

The deterministic variant is guaranteed to give the best PMEPR reduction for the given balancing set. The probabilistic variant is used in case the balancing set is so large that testing all members of the set is prohibitively expensive in terms of computational resources. It is shown in the Theory Section that the probability distribution of PMEPR improves significantly with each balancing vector that is tried in the probabilistic variant.

Figure 1:
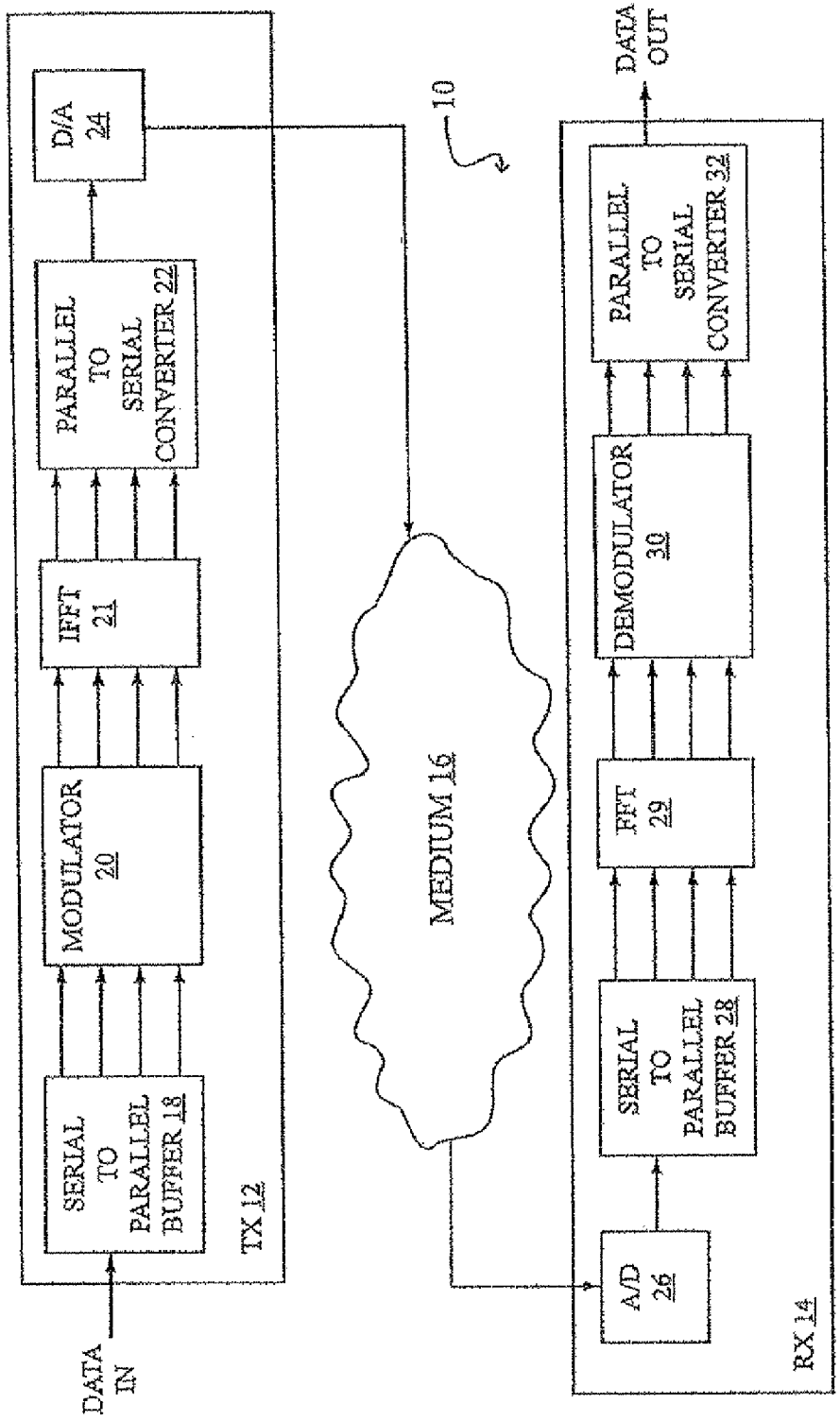
FIG. 1 is a high-level schematic block diagram of a system of the present invention.

Referring now to the drawings, FIG. 1 is a high-level schematic block diagram of a system 10 of the present invention. FIG. 1 is modeled after FIG. 3B of Arnesen, US Patent Application Publication No. 2003/0026201, which is incorporated by reference for all purposes as if fully set forth herein. As shown in FIG. 1, system 10 includes a transmitter 12 and a receiver 14. Transmitter 12 uses the method of the present invention to modulate data to be transmitted and transmits the modulated data to receiver 14 via a multi-channel medium 16. Examples of a suitable multi-channel medium 16 include a wire, a cable, an optical fiber, a coaxial cable, a waveguide, a radio-frequency propagation path, an optical propagation path and a twisted pair cable. Receiver 14 receives and demodulates the data.

Transmitter 12 includes a serial-to-parallel buffer 18, a modulator 20, an Inverse Fast Fourier Transform (IFFT) unit 21, a parallel-to-serial converter 22 and a digital-to-analog converter 24. Serial-to-parallel buffer 18 partitions the input stream of digital bits to n parallel substreams. Modulator 20 modulates the n substreams in accordance with the method of the present invention. Specifically, given n subsets of q bits each to transmit, modulator 20 encodes each subset as a respective symbol $\xi_l$, and selects an appropriate balancing vector $\epsilon$ for the symbols from a set of size $2^p$ of codewords of length n in $\{-1,1\}$. Modulator 20 multiplies each symbol $\xi_l$ by the corresponding element $\epsilon_l$ of the balancing vector $\epsilon$ and then modulates the corresponding subcarrier $\exp(i2\pi(f_0+lf_s)t)$ with the resulting product. This modulation is done in the frequency domain. IFFT unit 21 converts the frequency-domain subcarriers into time-domain samples. Parallel-to-serial converter 22 serializes the time-domain samples and digital-to-analog converter 24 transforms the time domain samples into an analog signal that is transmitted to receiver 14 via medium 16.

Transmitter 12 also transmits to receiver 14, via medium 16, for each set of nq bits, p bits of side information that indicate which balancing vector from among the possible $2^p$ balancing vectors has been used. As discussed in the theory section, the p side information bits can be encoded in the symbol vector $\xi$ along with the transmitted data bits. Alternatively, the p side information bits can be transmitted out-of-band.

Receiver 14 includes an analog-to-digital converter 26, a serial-to-parallel buffer 28, an FFT unit 29, a demodulator 30 and a parallel-to-serial converter 32. Analog-to-digital converter 26 transforms the analog signal received from medium 16 into received time-domain samples. Serial-to-parallel buffer 28 parallelizes the received time-domain samples. FFT unit 29 converts the received time-domain samples into received frequency-domain orthogonal subcarriers corresponding to the modulated orthogonal subcarriers that were transformed by IFFT unit 21 to the time domain. Demodulator 30 demodulates the received orthogonal subcarriers to recover n symbols and then uses its knowledge of the balancing vector $\epsilon$, obtained from the p bits of side information, to multiply each recovered symbol by the corresponding element of $\epsilon$. Demodulator 30 then decodes each recovered symbol to obtain the corresponding subset of q received data bits. Parallel-to-serial converter 32 serializes the n subsets of received data bits to a set of nq serial output bits.

Modulator 20, demodulator 30, IFFT unit 21 and FFT unit 29 may be implemented in hardware, firmware or software.

Theory Section

1. Introduction 1.2. Discrete and Continuous Maxima $\theta$ was defined above as $2\pi f_s t$. Observe that $\theta$ varies continuously over $[0,2\pi)$. We therefore have to minimize a function of continuous argument. Fortunately, the following lemma (G. Wunder and H. Boche, "Peak value estimation of bandlimited signals from their samples, noise enhancement, and a local characterization of the neighbourhood of an extremum", *IEEE Trans. Signal Processing*, vol. 51, 3, pp. 771-780 (2003)) allows to reduce the problem to minimization over a discrete set of samples.

Lemma 1. Let $$P(\theta) = \sum_{l=1}^{n} \xi_c e^{p\theta l}.$$

Then, for a>1, such that a·n is integer, $$\max_{\theta \in [0,2\pi)} |P(\theta)| \leq \frac{1}{\cos\frac{\pi}{2a}} \cdot \max_{i=1,2,\ldots,an} |P(\theta_i)|, \quad \theta_i = \frac{2\pi i}{an}$$

In fact this theorem can be improved for $a \in (1,2)$. However, in the context of the present invention this interval does not seem to be of relevance.

1.2. Bounds by Projections

Let $m_\xi^R(\theta)$ and $m_\xi^I(\theta)$ be the real and imaginary parts of $m_\xi(\theta)$ correspondingly. Then we have Lemma 2.

$$\max_{\theta \in [0,2\pi)} |m_\xi(\theta)| \leq \frac{\sqrt{2}}{\cos\frac{\pi}{2a}} \cdot \max_{i=1,2,\ldots,an} [m_\xi^R(\theta_i), m_\xi^I(\theta_i)].$$

Proof. By the previous lemma, we write $$\max_{\theta \in [0,2\pi)} |m_\xi(\theta)\rho| \leq \frac{1}{\cos\frac{\pi}{2a}} \cdot \max_{i=1,2,\ldots,an} |m_\xi(\theta_i)| \leq$$

$$\frac{\sqrt{2}}{\cos\frac{\pi}{2a}} \cdot \max_{i=1,2,\ldots,an} [m_\xi^R(\theta_i), m_\xi^I(\theta_i)].$$

Consequently, we have to simultaneously minimize $2 \cdot a \cdot n$ expressions $|m_\xi^R(\theta_i)|$ and $|m_\xi^I(\theta_i)|$, $i=1, 2, \ldots, a \cdot n$. In fact, this approach can be improved. Indeed, instead of projecting on two axes (real and imaginary) we may pick a larger number, say b, of evenly distributed lines passing through the origin, $$r_i(\varphi) = re^{\left(\frac{2\pi i}{b} + \varphi\right)}, \quad r \in (-\infty, \infty), \quad i = 1, \ldots, b.$$

For a complex number c, let $c^{(i)}(\phi)$ be its orthogonal projection on $r_i(\phi)$, $$|c^{(i)}(\phi)| = |(c, r_i(\phi))|.$$

We can also write $$c^{(i)}(\varphi) = \text{Re}\left\{c \cdot e^{-\left(\frac{2\pi i}{b} + \varphi\right)}\right\}.$$

Straightforward analysis similar to the proof of the previous lemma gives then the following statement.

Lemma 3. For any complex number c, $$|c| \le \frac{1}{\cos\left(\frac{\pi}{2b}\right)} \cdot \max_{i=1,\ldots,b} |c^{(i)}(\varphi)|.$$

If c belongs to the set $$R = \left\{ c : c = r_j \cdot e^{\frac{2\pi p}{h} \cdot j}, r_j \in R, j \in Z \right\},$$

and b divides h, then choosing $$\varphi = \frac{\pi}{2b} - \frac{\pi}{h},$$

we get $$|c| \le \frac{1}{\cos\left(\frac{\pi}{2}\left(\frac{1}{b} - \frac{2}{h}\right)\right)} \cdot \max_{i=1,\ldots,b} |c^{(i)}(\varphi)|.$$

Remark 1.4. The reasoning here is similar to that of Wunder & Boche where however twice as many projections are used. Notice also that Lemma 2 is a special case of Lemma 3 when b=2 and φ=0. The lemma can be also further improved for b not necessary dividing n, by optimization in φ. Since the gain we obtain is negligible for n's of practical interest, we omit the easily reconstructible cumbersome details.

In what follows this result will be used for simultaneous minimization of b≧2 projections of $m_{\underline{\varsigma}}(\theta)$ at each point $$\theta_i, \theta_i = \frac{2\pi i}{an}.$$

We will show in Subsection 1.7 that we can implement this minimization by choosing optimal signs for each subcarrier, thus transforming the problem into that of joint minimization of b·a·n bounded linear forms.

1.3. Linear Forms

Definition 5. A linear form L in n variables $(x_1, \ldots, x_n)$ is $$L(x_1, \ldots, x_n) = \sum_{j=1}^{n} a_j x_j,$$

where all $a_j$ are real. If $|a_j| \le A$ for j=1, ..., n, and a finite A>0, the form is called bounded by A.

1.4. Strength of Codes

Definition 6. Let D be a binary code of length n. The strength t of D is the maximal number such that for any fixed set of t positions, as we let the codewords vary over D, every possible t-tuple (out of $2^t$ possibilities) occurs in these positions the same number of times, $$\frac{|D|}{2^t}.$$

It is known that a code which is dual to a code with the minimum distance t+1 has strength t. An example of codes with fixed or slowly growing with the length strength is given by the codes dual to BCH codes, see e.g. F. J. MacWilliams and N. J. A. Sloane, *The Theory of Error-correcting Codes* (Elsevier, 1977). These codes have length $n=2^m-1$, the number of information bits ms (i.e. the number of codewords is $2^{ms}$), and strength 2s. They are dual to BCH codes of the minimum distance 2s+1. For the length $n=2^m$ we will exploit duals of the extended BCH codes (with extra overall parity check bit), thus obtaining codes of length $n=2^m$, size $2^{ms+1}$, and strength 2s+1. These codes can be evidently considered also as being of strength 2s.

Remark 7. For the sake of completeness let us elaborate on implementations of dual BCH codes' encoding. Since these codes are cyclic their codewords can be generated by LSFR having sm flip-flops. Another simple implementation is based on the following less-known description. Let $F_q$ be the finite field of size $q=n+1=2^m$, having α as a primitive element. Let F(x) be the set of polynomials of the form $f(x)=f_1 x+f_3 x^3+\ldots+f_{2s-1}x^{2s-1}$ with the coefficients from $F_{q^{m-1}}$. Clearly $|F(x)|=2^{ms}$. Let Tr(x), $Tr(x)=x+x^2+x^{2^2}+x^{2^3}+\ldots+x^{2^{m-1}}$, be the trace function linearly mapping elements from $F_q$ to $F_2$. Then the collection of vectors d, $d \in \{\pm 1\}^n$, with the components $d_i=(-1)^{Tr(f(\alpha^i))}$, i=1, ..., $2^m-1$, and f running through F(x), constitutes the dual BCH code of strength 2s. For smaller than $2^m-1$ lengths one can use duals of shortened BCH codes, thus obtaining codes of length $2^m-1-1$, size $2^{ms}$, and strength 2s.

1.5. Rate of Channel Codes

Definition 8. Let |C| be the number of possible codewords in a channel code C. The rave of the code C, chosen from a q-ary constellation, is $$R = \frac{1}{n} \log_q |C|.$$

The rate hit of the code is 1−R.

1.6. Selective Mapping

The idea of selective mapping is simple: partition all possible signals to subsets and pick from each subset a representative with the minimum PMEPR. More formally, let $Q^n$ be the collection of all vectors of length n with coordinates belonging to a constellation Q. Assume there exists a partition of $Q^n$ into M non-intersecting subsets $Q_i$ of equal size $$\frac{q^n}{M}.$$

The information is conveyed by the index of the chosen subset, and is transmitted by picking one of the vectors belonging to the corresponding subset. The channel code C consists of the vectors, one per subset, possessing the minimum PMEPR among the vectors in the subset. Thus $$PMEPR(C) \leq \max_{i=1,\ldots,M} \min_{\xi \in Q_i} PMEPR(\xi).$$

The rate of the defined code is $$1 - \frac{1}{n}\log_q M.$$

There are several simple methods of defining the partitioning. E.g. let $|Q|=q$, $M=q^r$, and $g_1, g_2, \ldots, g_M$, be invertible mappings from $Q^{n-r}$ to itself. Given an information vector $v \in Q^{n-r}$ we determine the minimum PMEPR of the vectors $g_1(v), \ldots, g_M(v)$, and transmit the best vector along with the index of the best transform (side information). This will clearly be a vector in $Q^n$. For instance, one can choose $g_1$ to be identity, and $g_2$ to be a pseudo-random (scrambling) transform.

1.7. Peak Reduction Scheme of Sharif and Hassibi

Let us briefly review the peak reduction scheme of Sharif and Hassibi. Since, by Lemma 2, $$\max_{\theta \in [0,2\pi)}|m_\xi(\theta)| \leq \frac{1}{\cos\frac{\pi}{2a}}\sqrt{\max_{i=1,2,\ldots,an}[m_\xi^R(\theta_i)]^2 + \max_{i=1,2,\ldots,an}[m_\xi^I(\theta_i)]^2},$$

$$\theta_i = \frac{2\pi i}{an}, m_\xi^R(\theta_i) = \sum_{l=1}^n \mathrm{Re}(\xi_l e^{z\theta,l}), \theta_i = \frac{2\pi i}{an}, i = 1, 2, \ldots,$$

$$a \cdot n, m_\xi^I(\theta_i) = \sum_{l=1}^n \mathrm{Im}(\xi_l e^{z\theta,l}), \theta_i = \frac{2\pi i}{an}, i = 1, 2, \ldots, a \cdot n,$$

our minimization problem is equivalent to the problem of minimization of $2 \cdot a \cdot n$ expressions $|m_\xi^R(\theta_i)|$ and $|m_\xi^I(\theta_i)|$, $i=1, 2, \ldots, a \cdot n$.

This joint minimization problem is tackled by choosing signs of each subcarrier. Thus we have to minimize $2an$ bounded linear forms $$\min_{s \in \{-1,1\}^n} \max_{i=1,2,\ldots,2an} |L_i(s)|, L_i(s) = \sum_{l=1}^n a_{il} \cdot s_l,$$

with $$a_{il} \begin{cases} \mathrm{Re}(\xi_l e^{z\theta,l}) & i = 1, 2, \ldots, a \cdot n \\ \mathrm{Im}(\xi_l e^{z\theta,l}) & i = a \cdot n + 1, a \cdot n + 2, \ldots, 2a \cdot n \end{cases}, \theta_i = \frac{2\pi i}{an}.$$

Sharif and Hassibi proposed an efficient algorithm for choosing the optimal signs for each subcarrier, that deterministically reduces the PMEPR of a code word $\xi=(\xi_1, \ldots, \xi_n)$, with $|\xi_i| \leq \sqrt{E_{max}}$, to $$\frac{4E_{max}}{\cos^2(\pi/2a)E_{av}}\ln(4 \cdot a \cdot n) := c_1 \cdot \ln(4 \cdot a \cdot n), \quad (1.1)$$

where $E_{av}$ is the average energy of the constellation.

Remark 9. Observe that by using Lemma 3 with integer $b>2$, the constants in the above expression can be reduced, giving $$\min_{b \geq 2} \frac{2E_{max}}{\cos^2(\pi/2b)\cos^2(\pi/2a)E_{av}}\ln(2 \cdot b \cdot a \cdot n).$$

Since the optimal signs have to be conveyed to the receiver, we need to transmit n bits about the n chosen signs as a side information. Therefore, the algorithm features the rate loss of $\log_q 2$. In a preprint published in 2004 and titled "High rate codes with bounded PMER for BPSK and other symmetric constellations", Sharif and Hassibi improved the rate efficiency of the algorithm, at the expense of PMEPR: the number of tones used for reduction is $$\frac{n}{r}\log_q 2,$$

for PMEPR of $r \cdot c_1 \cdot \ln 4an$, with $c_1$ as in (1.1).

2. Code Strength and Balancing Linear Forms

We hereby establish a connection between the strength of codes over $\{-1,1\}$, and their ability to balance linear forms when code vectors are used as the sign vectors.

Theorem 2.1. Let D be a code over $\{-1,1\}$ of length n and having strength $2s$, and m bounded linear forms $$L_i(x_1, \ldots, x_n), i=1, \ldots, m.$$

Then $$\min_{d \in D}\max_i |L_i(d)| \leq \left(\frac{(2s)!}{2^s s!} \cdot \sum_{i=1}^m \left(\sum_{k=1}^n a_{ik}^2\right)^s\right)^{1/(2s)}. \quad (2.1)$$

Moreover, for any real $\alpha>1$, randomly chosen codeword $d \in D$, and $i=1, 2, \ldots, m$, $$Prob_{d \in D}\left(|L_i(d)| \geq \left(\alpha \cdot m \cdot \frac{(2s)!}{2^s s!} \cdot \left(\sum_{k=1}^n a_{ik}^2\right)^s\right)^{1/(2s)}\right) \leq \frac{1}{\alpha \cdot m}. \quad (2.2)$$

Proof. Define $$\Gamma_i = \sum_{d \in D}(L_i(d))^{2s} = \sum_{d \in D}\left(\sum_{j=1}^n a_{ij}d_j\right)^{2s}.$$

Rewrite the expression for $\Gamma_i$:

$$\Gamma_i = \sum_{d \in D}\sum_{\substack{j_1 \ldots j_{2s} \\ j_1, j_{2s} \in \{1,\ldots,n\}}}\prod_{m=1}^{2s}a_{ij_m}d_{j_m} =$$

$$= \sum_{\underline{j}}\prod_{m=1}^{2s}a_{ij_m} \cdot \sum_{d \in D}\prod_{m=1}^{2s}d_{j_m}$$

-continued $$= \sum_{\underline{j}} \prod_{k=1}^{n} a_{ik}^{\tau_k(\underline{j})} \sum_{d \in D} \prod_{k=1}^{n} d_k^{\tau_k(\underline{j})},$$

where the summation is over all vectors $\underline{j}=(j_1,\ldots,j_{2s})$, and $\tau_k(\underline{j})$ is the number of m's, $m=1,\ldots,2s$, such that $j_m=k$.

For a given $\underline{j}$, if there exists a k, such that $\tau_k(\underline{j})$ is odd, then since D is a strength 2s code, we have $\Sigma_{d \in D} \Pi_{k=1}^{n} d_k^{\tau_k(\underline{j})} = 0$. Otherwise, $$\sum_{d \in D} \prod_{k=1}^{n} d_k^{\tau_k(\underline{j})} = \sum_{d \in D} 1 = |D|.$$

Let $J = \{\underline{j}:\tau_k(\underline{j})$ is even for all $k\}$. We thus have $$\Gamma_i = \left( \sum_{\underline{j} \in J} \prod_{k=1}^{n} a_{ik}^{\tau_k(\underline{j})} \right) \cdot |D|, \quad (2.3)$$

It is easily shown that $$\sum_{\underline{j} \in J} \prod_{k=1}^{n} a_{ik}^{\tau_k(\underline{j})} \leq \frac{(2s)!}{2^s s!} \cdot \left( \sum_{k=1}^{n} a_{ik}^2 \right)^s. \quad (2.4)$$

To see this note that $\Sigma_{\underline{j} \in J} \Pi_{k=1}^{n} a_{ik}^{\tau_k(\underline{j})}$ and $(\Sigma_{k=1}^{n} a_{ik}^2)^s$ contain the same terms, but with different coefficients:

$$\sum_{\underline{j} \in J} \prod_{k=1}^{n} a_{ik}^{\tau_k(\underline{j})} = \sum_{\substack{\{s_1,\ldots,s_n\} \in \{0,1,2,\ldots,s\} \\ s_1+\ldots+s_n=s}} \frac{(2s)!}{(2s_1)!(2s_2)!\cdots(2s_i)!} \cdot a_{i1}^{2s_1} a_{i2}^{2s_2} \cdots a_{in}^{2s_n}$$

$$\equiv \sum_{\substack{\{s_1,\ldots,s_n\} \in \{0,1,2,\ldots,s\} \\ s_1+\ldots+s_n=s}} K_{s_1 s_2 \ldots s_n}^{(1)} \cdot a_{i1}^{2s_1} a_{i2}^{2s_2} \cdots a_{in}^{2s_i},$$

$$\left( \sum_{k=1}^{n} a_{ik}^2 \right)^s = \sum_{\substack{\{s_1,\ldots,s_n\} \in \{0,1,2,\ldots,s\} \\ s_1+\ldots+s_n=s}} \frac{(s)!}{(s_1)!(s_2)!\cdots(2s_i)!} \cdot a_{i1}^{2s_1} a_{i2}^{2s_2} \cdots a_{in}^{2s_n}$$

$$\equiv \sum_{\substack{\{s_1,\ldots,s_n\} \in \{0,1,2,\ldots,s\} \\ s_1+\ldots+s_n=s}} K_{s_1 s_2 \ldots s_n}^{(2)} \cdot a_{i1}^{2s_1} a_{i2}^{2s_2} \cdots a_{in}^{2s_n}.$$

To get (2.4), note $$\frac{K_{s_1 s_2 \ldots s_n}^{(1)}}{K_{s_1 s_2 \ldots s_n}^{(2)}} = \frac{(2s)!}{s!} \cdot \frac{s_1!}{(2s_1)!} \cdot \frac{s_2!}{(2s_2)!} \cdots \frac{s_i!}{(2s_i)!} \leq \frac{(2s)!}{s!} \cdot \frac{1}{2^s}.$$

Consequently, $$\Gamma_i \leq |D| \frac{(2s)!}{2^s s!} \left( \sum_{k=1}^{n} a_{ik}^2 \right)^s.$$

Furthermore, $$\sum_{i=1}^{m} \Gamma_i = \sum_{i=1}^{m} \sum_{d \in D} (L_i(d))^{2s} \sum_{d \in D} \sum_{i=1}^{m} (L_i(d))^{2s} \leq |D| \frac{(2s)!}{2^s s!} \sum_{i=1}^{m} \left( \sum_{k=1}^{n} a_{ik}^2 \right)^s.$$

Since all $(L_i(d))^{2s} \geq 0$, from the last inequality it follows that for some $d' \in DA$, $$\sum_{i=1}^{m} (L_i(d'))^{2s} \leq \frac{(2s)!}{2^s s!} \sum_{i=1}^{m} \left( \sum_{k=1}^{n} a_{ik}^2 \right)^s.$$

Therefore, for $i=1,\ldots,m$, $$|L_i(d')| \leq \left( \frac{(2s)!}{2^s s!} \cdot \sum_{i=1}^{m} \left( \sum_{k=1}^{n} a_{ik}^2 \right)^s \right)^{1/(2s)},$$

proving (2.1).

Using the Chebyshev inequality, $$\mathrm{Prob}_{d \in D} \left( |L_i(d)| \geq \left( \alpha \cdot m \cdot \frac{(2s)!}{2^s s!} \cdot \left( \sum_{k=1}^{n} a_{ik}^2 \right)^s \right)^{1/(2s)} \right) \leq \frac{E_{d \in D}\{L_i^{2s}(d)\}}{\alpha \cdot m \cdot \frac{(2s)!}{2^s s!} \cdot \left( \sum_{k=1}^{n} a_{ik}^2 \right)^s},$$

we establish the correctness of (2.2).

With no further assumptions about the nature of the coefficients $a_{ik}$, we have the following Corollary 2. Under the conditions of Theorem 2.1, $$\min_{d \in D} \max_i |L_i(d)| \leq \left( m \cdot \frac{(2s)!}{2^s s!} \right)^{1/(2s)} \cdot \sqrt{n} \cdot \max_{\substack{i=1,2,\ldots,m \\ j=1,2,\ldots,n}} |a_{ij}|, \quad (2.5)$$

$$\mathrm{Prob}_{d \in D} \left( \max_i |L_i(d)| \geq \left( \alpha \cdot m \cdot \frac{(2s)!}{2^s s!} \right)^{1/(2s)} \cdot \sqrt{n} \cdot \max_{\substack{i=1,2,\ldots,m \\ j=1,2,\ldots,n}} |a_{ij}| \right) \leq \frac{1}{\alpha}, \quad (2.6)$$

Moreover, for $|\alpha_{ij}| \leq 1$, for all $i$, $j$, $m = a \cdot b \cdot n$, $s = \ln n$, $n \geq 2$, $$\min_{d \in D} \max_i |L_i(d)| \leq \sqrt{2n \ln n} \cdot (a \cdot b)^{1/(2 \ln n)} \cdot (1 + 1/(4 \ln n)), \quad (2.7)$$

$$\mathrm{Prob}_{d \in D} \left( \max_i |L_i(d)| \geq \sqrt{2 \alpha n \ln n} \cdot (a \cdot b)^{1/(2 \ln n)} \cdot (1 + 1/(4 \ln n)) \right) \leq \frac{1}{n^{\ln \alpha}}, \quad (2.8)$$

Proof. To get (2.5) and (2.6), put $|a_{ik}| \leq \max_{\substack{i=1,2,\ldots,m \\ j=1,2,\ldots,n}} |a_{ij}|$ in (2.1), (2.2). For (2.7), (2.8), use $$\sqrt{2\pi n} \cdot n^n \cdot e^{-n} \leq n! \leq \sqrt{2\pi n} \cdot n^n \cdot e^{-n+\frac{1}{12n}}, \quad (2.9)$$

$$e^{\frac{\ln 2}{4 \ln n} + \frac{1}{4D(\ln n)^2}} < 1 + \frac{1}{4 \ln n}, n \geq 2.$$

3. Method of the Present Invention for PMEPR Reduction

3.1. Strength of Codes and PMEPR Reduction

Let D be a code from $\{-1,1\}^n$ of strength 2s. The vectors d∈D are candidates for being chosen as the sign vectors. Let $\xi \in Q^n$. Given a—the oversampling factor, b—the number of projection axes, and $\phi$—the projection angle, we are facing joint minimization of b·a·n bounded linear forms, $$L_i(d) = L_i(d_1, \ldots, d_n) = \sum_{l=1}^{n} a_{il} \cdot d_l,$$

where $$\theta_i = \frac{2\pi i}{an}$$

and $$a_{il} = \begin{cases} \operatorname{Re}\{\xi_l e^{i(\theta_i l - \frac{2\pi}{b})}\}, & i = 1, 2, \ldots, an, \\ \operatorname{Re}\{\xi_l e^{i(\theta_i l - \frac{4\pi}{b})}\}, & i = an+1, an+2, \ldots, 2an \\ \ldots \\ \operatorname{Re}\{\xi_l e^{i(\theta_i l - \frac{2\pi b}{b})}\}, & i = (b-1)an+1, (b-1)an+2, \ldots, ban \end{cases} \quad (3.1)$$

For the case when the linear forms are given by (3.1), a more thorough analysis of the structure of (2.1), allows to state the following bound we give here without proof.

Theorem 3.1. Under the conditions of Theorem 2.1, with m=b·a·n linear forms, given by (3.1), $$\min_{d \in D} \max_i |L_i(d)| \leq M, \quad (3.2)$$

for $\alpha > 1$, $$\operatorname{Prob}_{d \in D}\left(\max_i |L_i(d)| \geq \sqrt{\alpha} M\right) \leq \frac{1}{\alpha^s}, \quad (3.3)$$

where for MPSK, $$M = \left(\frac{(2s)!}{2^s s!}\right)^{1/(2s)} \cdot \left(b \cdot a \cdot n \left[\left(\frac{n}{2}\right)^s \cdot \left(1 + \frac{n^{-\frac{1-\ln 2}{2}}}{\sqrt{2}}\right)^s + n^{-\ln 2} \cdot n^s\right]\right)^{1/(2s)}$$

Similar bounds can be derived for other reflection-symmetric constellations, e.g. QAM. We omit the cumbersome details.

Corollary 3.2. Under the conditions of Theorem 3.1, for s=ln n, n≥2, $$\min_{d \in D} \max_i |L_i(d)| \leq \sqrt{n \ln n} \cdot \left(1 + \frac{3}{2 \ln n}\right),$$

$$\operatorname{Prob}_{d \in D}\left(\max_i |L_i(d)| \geq \sqrt{\alpha n \ln n} \cdot \left(1 + \frac{3}{2 \ln n}\right)\right) \leq \frac{1}{n^{\ln \alpha}}.$$

Proof.

Use $\left(\left(1 + \frac{n^{-\frac{1-\ln 2}{2}}}{\sqrt{2}}\right)^{\ln n} + 1\right)^{1/(2\ln n)} < 1 + \frac{1}{\ln n},$ together with (2.9).

Theorem 3.3. Let D be a code of strength 2s from $\{-1,1\}^n$. For every $\xi \in Q^n$, there exists a d∈D, such that $$\operatorname{PMEPR}(\xi * d) \leq Y := = \quad (3.4)$$

$$\frac{E_{max}}{E_{av}} \cdot \min_{a>1, a \in N} \min_{b>1, b \in Z} \left\{\frac{a^{1/s}}{\cos^2 \pi/2a} \cdot \frac{b^{1/s}}{\cos^2 \pi/2b} \cdot \left(\frac{(2s)!n}{2^{2s} s!}\right)^{1/s} \cdot (1 + 2/s)\right\},$$

$$\xi * d := (\xi_1 d_1, \ldots, \xi_n d_n).$$

Since Q is reflection-symmetric, $\xi * d \in Q^n$.

Proof. Use Theorem 2.1 combined with Lemma 1.3 and the definition of PMEPR. Also use the inequality $((1+1/\sqrt{2n^{1-\ln 2}})^s + 1)^{1/s} < 1 + 2/s$, n≥2.

Corollary 3.4. Under the conditions of Theorem 3.3, for s=ln n, and for all n≥$n_0$, we have $$Y \leq n \ln n \cdot \frac{E_{max}}{E_{av}} \cdot \left(1 + \frac{\sigma_{n_0} \ln \ln n}{\ln n}\right),$$

where $\sigma_{64}=22$, $\sigma_{128}=17$, $\sigma_{2048}=9$, and $\sigma_{n_0}=1+\epsilon$, $\epsilon>0$ becoming arbitrary small for large $n_0$.

Proof. Choose $a=b=\sqrt{\ln n}$, and use standard inequalities.

3.2. PMEPR Reduction Scheme

Let D be a code of strength 2s from $\{-1,1\}^n$ of size $2^p$. The following particular case of selective mapping is used. Let $\xi = \xi = (\xi_1, \ldots, \xi_n) \in Q^n$ be the vector we wish to transmit. Compare PMEPR of $2^p$ vectors, $\xi * d$, where d runs over D, and send the signal corresponding to $\xi * = \xi * d'$ with the minimum PMEPR, along with the side information of p bits indicating which balancing vector has been chosen. This allows at the receiver to recover d' by encoding the p information bits into the corresponding word from D, and therefore reconstruct the vector $\xi = \xi * * d'$. We arrive at the following result.

Theorem 3.5. Let D be a binary linear systematic code of strength 2s and size $2^p$. Then there exists a scheme for PMEPR reduction guaranteeing PMEPR not exceeding Y from (3.4) with the rate hit $$\frac{p \log_q 2}{n}$$

and complexity proportional to $n2^p$.

Using duals of BCH codes we obtain the following corollary.

Corollary 3.6. The PMEPR reduction scheme of the present invention guarantees the maximum PMEPR of Y defined in (3.4) with the rate hit $$\frac{s \log_q(n+1)}{n}.$$

Remark 3.7. Notice that to compute PMEPR in die algorithm it is necessary to calculate the values of a·n complex linear forms, the projection on axes is used only in the proof. Starting from Theorem 3.3 we neither have used minimization in the starting projection angle φ, nor have we taken into account that the factor A can be simultaneously strictly less than 1 for all the forms. Clearly this can be used in computations for particular cases. However, we did not find examples where this provides a significant difference.

Remark 3.8. Transmission of the side information is an important issue in implementation of the algorithm of the present invention. In what follows we discuss several options. We assume that the signal ξ is obtained as a result of coding which can be distorted by the following multiplication by a balancing vector. A choice at the receiver is that we may either first multiply by the balancing vector followed by decoding, or start from decoding and then multiply by the balancing vector.

The simplest situation is when there exist very reliable uncoded bits which can be used for conveying the index of the balancing vector (e.g. when only one or two bits from constellation of size 8 or more are protected by error-correcting code). If these bits are mapped to antipodal constellation points this does not affect the resulting PMEPR.

Another possibility is that we have p reliable subcarriers (this can be achieved e.g. by decreasing the size of the constellation in these subcarriers). Without loss of generality assume that these p subcarriers are the first ones, otherwise a permutation of the balancing vectors should be used. Let D be a systematic code, i.e. having the information bits at its first p positions. Let Q* be a half of the constellation Q, in which we pick one out of every pair of antipodal points. Let ξ= $(\xi_1, \ldots, \xi_n)$ with $\xi_1, \ldots, \xi_p \in Q^*$, and $\xi_{p+1}, \ldots, \xi_n \in Q$. Compare PMEPR of $2^p$ vectors, ξ*d, where d ruins over D, and send the signal corresponding to ξ*=ξ*d' with the minimum PMEPR. At the receiving end one deduces the binary information vector of d' by checking if in the received vector ξ* each of the first p components belongs or does not belong to Q*.

In this setting it is also possible to compress the information about the chosen code vector to the nearest integer greater than s $\log_q$(n+1) tones (perhaps reserved). This allows further minimization of the number of the subcarriers affected by the algorithm. In this case the minimization of PMEPR is done for the signal vector containing the transmitted information. This however yields a slight increase by s $\log_q$(n+1) in the estimate for PMEPR.

Now consider the situation when we prefer to decode first and only then to subtract the balancing vector. Let the transmitted information be protected by some error-correcting code D', i.e. only vectors ξ∈D'⊂Q" are sent. To start from decoding in D' we have to guarantee that the modified vector always belongs to D'. For instance, if q=2, i.e. when we use BPSK, and D' is a linear code, it is sufficient that the code D we use for balancing is a subcode of D'. Then the modified vector ξ* also belongs to D' and can be decoded without knowledge of the balancing vector. For higher than BPSK constellations and use of linear code, the embedding D⊂D' provides a sufficient condition for this scheme to work. This embedding is not very restrictive. For example, if D is a dual BCH code of fixed strength, it is possible to show that it is nested in BCH codes with a constant minimum distance. As well it is possible to design efficient LDPC codes containing duals of BCH codes. We plan to address the problem of constructing such codes elsewhere.

4. Probabilistic Analysis and a Practical Scheme

In the previous sections we provided deterministic and probabilistic bounds on PMEPR, using balancing vectors from codes of given strength. In this section we will demonstrate how a practical scheme can be designed based on the above, and provide a probabilistic analysis of such scheme.

Indeed, implementation of the full deterministic scheme for meaningful s is computationally challenging. However, by picking at random at most a fixed number of balancing vectors from the code, we could guarantee achieving arbitrary close to 1 probability of PMEPR restricted to the derived deterministic bound. Following the Remark 3.8, the possible implementations of the scheme vary accordingly with the chosen method of the balancing vector transmission.

To analyze the probabilistic scheme of the present invention, assume that s=ln n, and the number of balancing vectors used is h. Using Chernoff bound (N. Alon and J. Spencer, *The Probabilistic Method* (Wiley, 2000)) for real α>1, and large n, and its tightness for a single linear form, for a random channel code C, we have $$0.5n^{-\alpha} \leq \text{Prob}(\text{PMEPR}(C) \geq \alpha \ln n) \leq 2n^{-\alpha+1} \quad (4.1)$$

i.e. a polynomial in n decrease.

Considering another range of PMEPR, we have for β>0, $$\text{Prob}(\text{PMEPR}(C) \geq \ln n + \beta \ln \ln n) \leq 2 \ln^{-\beta} n. \quad (4.2)$$

The constants in these expressions can be improved.

Theorem 4.1. For any $\xi \in Q^n$, let $d_1, d_2, \ldots, d_h$ be randomly picked from a code D of strength 2 ln n. Then, for all $n \geq n_0$, $$\text{Prob}\left(\min_{i=1,2,\ldots,h} \text{PMEPR}(\xi * d_i) \geq \alpha \ln n + \sigma_{n_0} \ln \ln n\right) \leq n^{-h \ln \alpha}, \quad (4.3)$$

$$\text{Prob}\left(\min_{i=1,2,\ldots,h} \text{PMEPR}(\xi * d_i) \geq \ln n + (\beta + \sigma_{n_0}) \ln \ln n\right) \leq \quad (4.4)$$

$$n^{-h\left(\ln\left(1 + \beta \frac{\ln \ln n}{\ln n}\right)\right)},$$

where the constant $\sigma_{n_0}$ is given by Corollary 3.4.

Proof. Immediate from Corollary 3.4.

Remark 4.2. Indeed, we see that the proposed scheme allows us to considerably improve the PMEPR statistics, using only (ln 2)·($\log_2$ n)+1 bits of redundancy (the nearest integer greater or equal to $$\frac{(\ln 2)(\log_2 n)^2 + 1}{\log_2 q}$$

redundant subcarriers), and a modest increase in complexity. Moreover, our result is mathematically rigorous, applicable to any reflection-symmetric constellation, and provides the reduction for any information vector. In other words, for any information vector, choosing h big enough, we can provably make the probability of the large PMEPR arbitrary small, up to the deterministic bounds, attained at h being equal the code size.

As an example, setting $h=\rho n/(\ln n \ln \alpha)$, we have for all $n \geq n_0$, $$Prob\left(\min_{i=1,2,\ldots,h} PMEPR(\xi * d_i) \geq \alpha \ln n + \sigma_{n_0} \ln \ln n\right) \leq e^{-\rho n},$$

As another example, setting $h=n/(\ln \ln n)$, for all $n \geq n_0$, $$Prob\left(\min_{i=1,2,\ldots,h} PMEPR(\xi * d_i) \geq \ln n + (\beta + \sigma_{n_0}) \ln \ln n\right) \leq e^{-\beta n \left(1 - \beta \frac{\ln \ln n}{\ln n}\right)},$$

i.e. comparing with (4.1), we transform the polynomially in n decreasing probability into an exponentially decreasing one.

5. Examples and Simulations

In the above, we have provided a probabilistic framework for PMEPR reduction towards certain values, depending on the scheme parameters (e.g. balancing code strength, oversampling a, number of axes b). Assume for simplicity that the constellation used has $E_{max}=E_{av}$ (for instance MPSK).

For any information vector length n, the balancing code strength 2s prescribes the optimal a, b. Denote the PMEPR bound, guaranteed for the channel code C, using the balancing code $D_{2s}$ of strength 2s (either deterministically, using the whole code, or probabilistically, using a chosen number of candidates, for the wanted peak probability reduction), by $PMEPR_{D_2}$ (C). For the balancing code of the least meaningful strength, 2s=4, say the dual of the extended BCH code of strength 4 (it is dual to the extended 2-error correcting BCH code), length $2^m$, having $2^{m+1}$ words, we need 2m+1 bits to indicate which specific code word is used. Choosing e.g. a=3, b=3, we obtain $PMEPR_{D_s}(C) \leq 8\sqrt{n/3}$. Using the optimal strength balancing code, e.g. the dual BCH code of length $n=2^m$ and strength 2 ln n, having $2^{m \ln n+1}$ words, we need m ln n+1 bits to indicate which specific codeword was used.

Tables 1 and 2 show $PMEPR_{D_2}$ (C) for various values of parameters for MPSK, n=128 (Table 1) and n=2048 (Table 2). Rate hit for QPSK is also calculated. For simplicity we restricted ourselves to integer a=b.

TABLE 1

PMEPR achievable by present invention, MPSK, n = 128, max. PMEPR = 21.07 dB

| code's half-strength s | 3 | 4 | 5 | 7 | 9 |
|---|---|---|---|---|---|
| optim. const. B, a | 4 | 5 | 5 | 6 | 7 |

TABLE 1-continued

PMEPR achievable by present invention, MPSK, n = 128, max. PMEPR = 21.07 dB

| $PMEPR_{D2s}$ (C) | 32.27 | 21.04 | 16.84 | 14.09 | 13.54 |
|---|---|---|---|---|---|
| $PMEPR_{D2s}$ (C) [dB] | 15.09 | 13.23 | 12.26 | 11.49 | 11.32 |
| rate hit for QPSK | 0.08594 | 0.11328 | 0.14063 | 0.19531 | 0.25000 |

TABLE 2

PMEPR achievable by present invention, MPSK, n = 2048, max. PMEPR = 33.11 dB

| code's half-strength s | 2 | 3 | 4 | 11 |
|---|---|---|---|---|
| optim. const. B, a | 3 | 4 | 5 | 7 |
| $PMEPR_{D2s}$ (C) | 329.65 | 76.46 | 39.40 | 16.21 |
| $PMEPR_{D2s}$ (C) [dB] | 25.18 | 18.83 | 15.95 | 12.10 |
| rate hit for QPSK | 0.00562 | 0.00830 | 0.01099 | 0.02979 |

Figure 2:
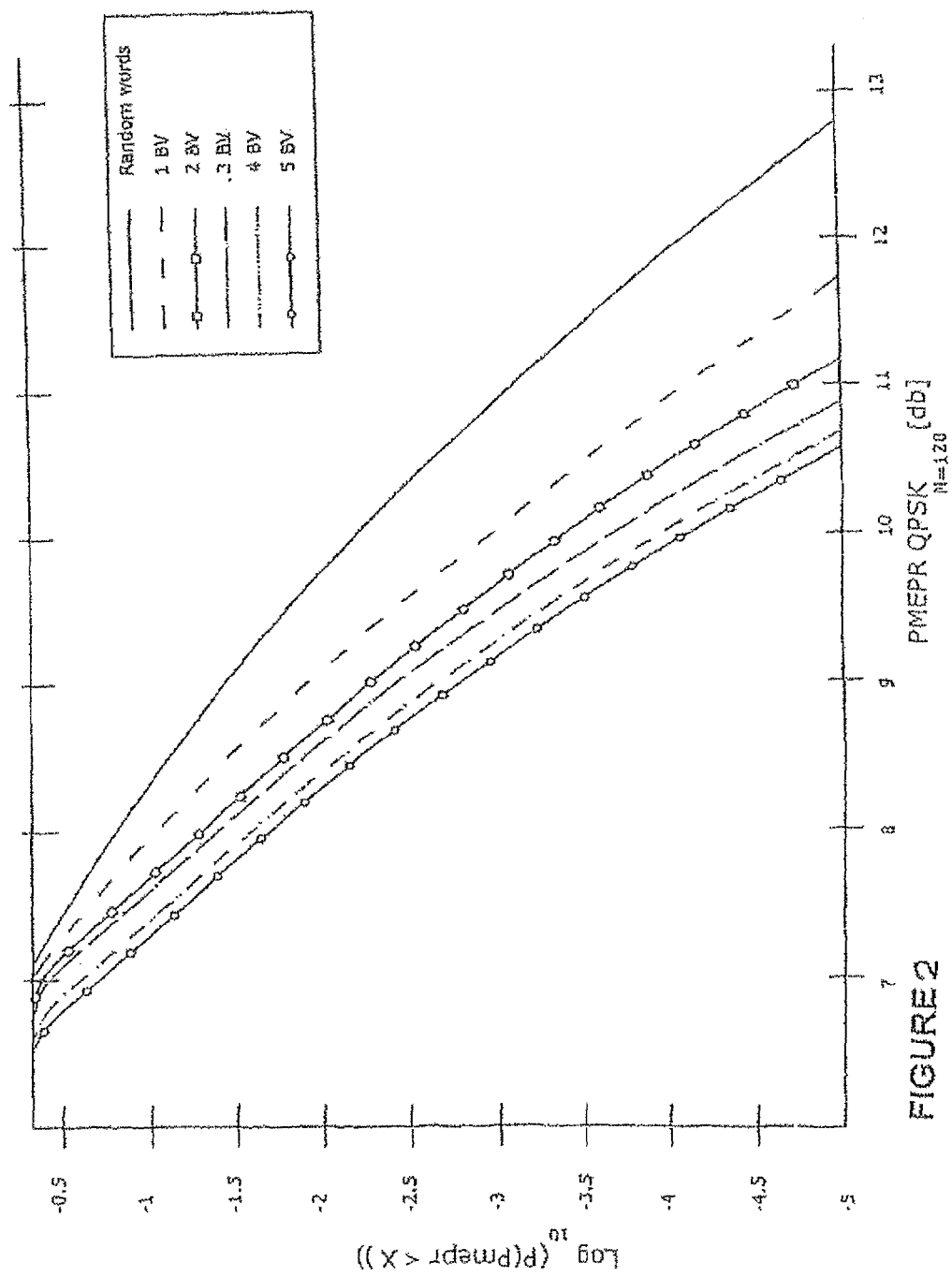
FIG. 2 shows plots of simulated PMEPR by the present invention using dual-BCH code vectors as balancing vectors.

FIG. 2 shows simulated 10 million runs for QPSK, n=128, with oversampling a=5, using balancing vectors (BV) randomly chosen from strength 2s=10 dual-BCH code (only 18 redundant carriers). For example, the peaks higher than 10.8 dB occur with probability $10^{-2}$. Using 4 BVs, the probability of such peaks is lowered to $10^{-5}$. Looking at it differently, to build a system, for any peak probability less than $10^{-25}$, we need an amplifier with the dynamic range reduced by 2 dB, at a modest cost of trying 4 BVs. The complexity can thus be traded for PMEPR reduction, up to the theoretical limits provided in the previous sections.

While the invention has been described with respect to a limited number of embodiments, it will be appreciated that many variations, modifications and other applications of the invention may be made.

What is claimed is:

1. A method of transmitting a plurality of bits, comprising the steps of:
   (a) partitioning the bits among n subsets, wherein n is an integer greater than 1;
   (b) encoding each subset as a respective symbol;
   (c) selecting a balancing vector, in accordance with said symbols, from a set of size $2^p$ of codewords of length n in $\{-1,1\}$, where p<n;
   (d) multiplying each symbol by a corresponding element of said balancing vector; and
   (e) transmitting said symbols.

2. The method of claim 1, wherein said transmitting includes modulating each of n mutually orthogonal subcarriers with a corresponding symbol.

3. The method of claim 1, wherein said set of codewords has a strength of at most about $2 \lfloor \ln n \rfloor$.

4. The method of claim 1, wherein said balancing vector is a codeword, selected from said set of codewords, that minimizes a peak-to-mean-envelope power ratio of an envelope of said transmitted symbols.

5. The method of claim 1, wherein said balancing vector is selected by picking said codewords randomly from said set of codewords and calculating corresponding peak-to-mean-envelope power ratios (PMEPRs) of an envelope of said transmitted symbols, said selected balancing vector being a codeword, from among said randomly picked codewords, whose corresponding PMEPR is smallest.

6. The method of claim 5, wherein said codewords are picked randomly until one corresponding PMEPR is less than a predetermined upper bound.

7. The method of claim 5, wherein said codewords are picked randomly until a number of said randomly picked codewords exceeds a predetermined upper bound.

8. The method of claim 1, further comprising the step of transmitting p bits of side information that indicate which codeword has been selected to serve as said balancing vector.

9. The method of claim 1, wherein said symbols are transmitted substantially simultaneously.

10. A transmitter for transmitting a plurality of bits, comprising:
   (a) a mechanism for partitioning the bits among n subsets, wherein n is an integer greater than 1; and
   (b) a modulator for:
      (i) encoding each subset as a respective symbol,
      (ii) selecting a balancing vector, in accordance with said symbols, from a set of size $2^p$ of codewords of length n in $\{-1,1\}$, where $p<n$,
      (iii) multiplying each symbol by a corresponding element of said balancing vector, and
      (iv) modulating each of n mutually orthogonal subcarriers with a corresponding symbol.

11. The transmitter of claim 10, wherein said mechanism includes a serial-to-parallel buffer.

12. The transmitter of claim 10, further comprising:
   (c) a mechanism for converting said modulated orthogonal subcarriers to time-domain samples;
   (d) a mechanism for serializing said time-domain samples; and
   (e) a digital-to-analog converter for transforming said serialized time-domain samples into an analog signal.

13. The transmitter of claim 12, wherein said mechanism for converting said modulated orthogonal subcarriers to time-domain samples includes an inverse Fourier transform unit.

14. The transmitter of claim 12, wherein said mechanism for serializing said time-domain samples includes a parallel-to-serial converter.

15. A communication system comprising:
   (a) the transmitter of claim 12;
   (f) a receiver; and
   (g) a medium for sending said analog signal to said receiver;
wherein said receiver includes:
   (i) an analog-to-digital converter for transforming said analog signal into received time-domain samples;
   (ii) a mechanism for parallelizing said received time-domain samples;
   (iii) a mechanism for converting said received time-domain samples into n received orthogonal subcarriers; and
   (iv) a demodulator for:
      (A) demodulating said received orthogonal subcarriers to recover n corresponding received symbols,
      (B) multiplying each said corresponding received symbol by a corresponding element of said balancing vector, and
      (C) decoding each said corresponding received and multiplied symbol to obtain a corresponding subset of received bits.

16. The communication system of claim 15, wherein said mechanism for parallelizing said received time-domain samples includes a serial-to-parallel buffer.

17. The communication system of claim 15, wherein said mechanism for converting said received time-domain samples into said received orthogonal subcarriers includes a Fourier transform unit.

* * * * *